Sept. 22, 1936.  E. G. THOMAS  2,055,394
STRAINER
Filed Nov. 20, 1934
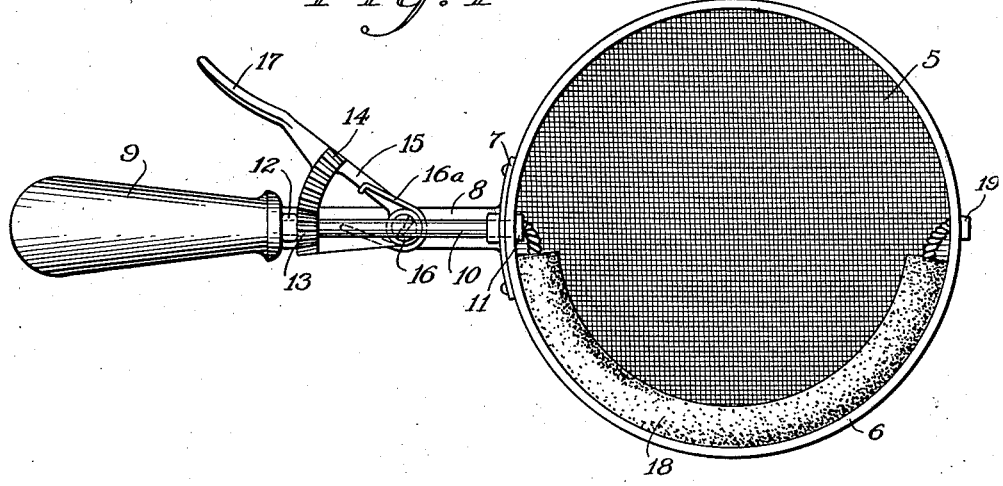
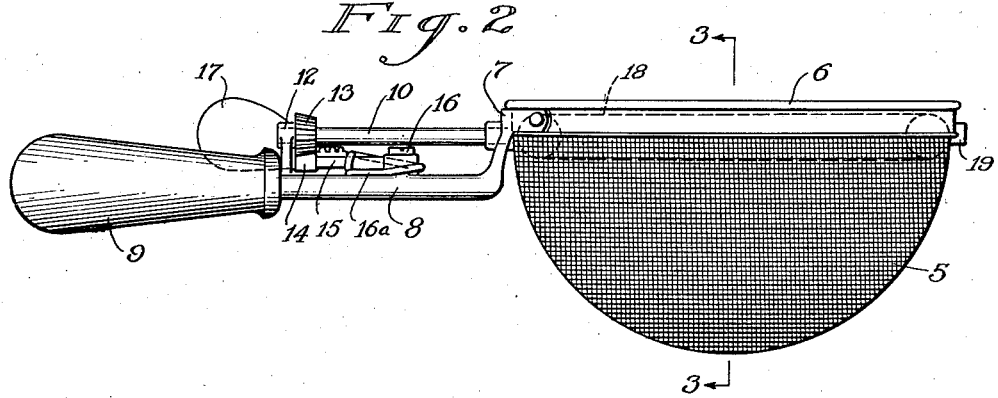
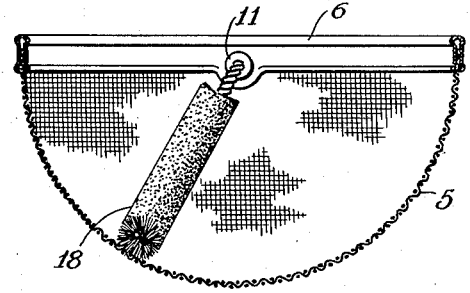
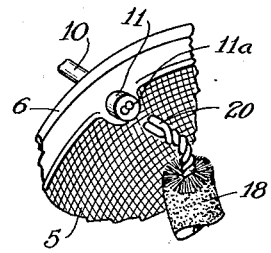
Eric G. Thomas
INVENTOR
BY Victor J. Evans & Co.
ATTORNEY Patented Sept. 22, 1936

2,055,394

UNITED STATES PATENT OFFICE 2,055,394

STRAINER

Eric G. Thomas, Boston, Mass.

Application November 20, 1934, Serial No. 753,981

1 Claim. (Cl. 209—283)

This invention relates to sieves, strainers and like kitchen utensils for sifting of flour and other materials.

One of the objects of my invention is to provide a strainer which may be supported and operated efficiently by only one hand of the user and which embodies simple means for the retention of an agitator within the strainer and permits the convenient removal for cleaning or replacement of same.

A further object of my invention is to provide a sieve having an agitator member adapted to be oscillated within same, the operation of which will effect the breaking up of the larger particles of material being sifted and will otherwise cause the material to more rapidly pass thru the sieve.

A further object of my invention is to provide in a strainer embodying the above features an agitator means which will effect the cleaning of the strainer after its use.

The invention will be fully and comprehensively understood from a consideration of the following detailed description when read in connection with the accompanying drawing which forms part of the application, with the understanding, however, that the improvement is capable of extended application and is not confined to the exact showing of the drawing nor to the precise construction described and, therefore, such changes and modifications may be made therein as do not affect the spirit of the invention nor exceed the scope thereof as expressed in the appended claim.

In the drawing:

Fig. 1 is a plan view of my device.

Fig. 2 is a side elevational view of same.

Fig. 3 is a sectional view taken on line 3—3 of Fig. 2, with the agitator member partly rotated; and Fig. 4 is a fragmentary view illustrating the connection of the agitator member to the drive shaft.

Referring now to the drawing for a more detailed description thereof, the numeral 5 indicates a wire cloth sieve of hemispherical formation, the edge of which is reinforced by a flange ring 6, to which is attached by the bracket 7 a handle shank 8, on the free end of which the handle 9 is secured. A drive shaft 10 extends thru and is journalled by the bracket 7 and is provided at its end within the strainer with a hub 11. The opposite end of shaft 10 is journalled in a bearing bracket 12 mounted on the shank 8 and carries fixedly mounted on it a pinion gear 13 which is adapted to mesh with a bevel gear sector 14. Gear 14 is carried on a frame 15 by which said gear is pivotally mounted to the shank 8 by the stud 16. Extending radially from the frame 15 is a thumb grip 17 so disposed with relation to handle 9 that when the user grips the handle between the fingers and the palm of the hand the thumb may readily engage grip 17 to oscillate same on its pivot 16. A torsional spring 16' is disposed on stud 15 and has its ends engaged respectively with the shank 8 and the frame 15 by which to return the thumb grip 17 to its outer position during the oscillation of the agitator 18. The agitator member 18, shaped in conformation to the interior of the sieve 5 and adapted to make a wiping contact with same, has its right end pivotally mounted on the sieve by the bearing 19, the opposite end being engaged in the hub 11 of the drive shaft.

The agitator member 18 is a brush-like structure in which the bristles are assembled to the body of the brush by twisting a pair of wires between which the bristles are held. Attention is directed to Fig. 4 illustrating the connection between the agitator member 18 and the drive shaft 10. It will be noted in this view that the terminal ends 20 of the wire forming the brush structure are straight and disposed parallel to each other. The hub 11 is provided with a pair of parallel axially disposed apertures 11a adapted to receive the terminal ends 20 of the agitator so that upon rotation of the shaft an oscillatory motion will be imparted to the agitator 18. It is to be noted here that this structure also permits the convenient removal and replacement of member 18 in that its structure is sufficiently resilient to permit the necessary contraction.

Altho the brush, as illustrated, is of the more preferred structure, it will be obvious that brushes of other construction may be readily adapted to function as an agitator within the sieve. It is however necessary that the portion of the brush coming in contact with the sieve be of circular formation for the purpose now described. It has been previously stated that the agitator 18 will function to break up particles and cause same to be forced thru the sieve. This effect is due to the tendency of the particles being sifted to become wedged between the sieve and the curved surface of the agitator as it is oscillated so that the bristles of the agitator will engage with said particles and push same thru the sieve. The same action of the agitator will occur when it is desired to clean the sieve after using.

What is claimed as new is:

In a strainer, a foraminous receptacle of substantially hemispherical form, a reciprocable round, substantially semi-circular brush contacting the inner surface of said receptacle, a handle extending from said receptacle, manually operable means adjacent the handle for moving said brush in one direction and means for automatically moving the brush in the opposite direction, said manually operable means comprising a shaft extending from one end of said brush, a gear fixedly mounted on said shaft, a lever pivoted at one end, an arcuate rack extending from said lever adjacent the ends of the latter and adapted to turn said gear, said brush including a resilient core of wires twisted together and bristles held between said wires and extending therefrom, means for detachably connecting one end of the core to the shaft and the other end to the receptacle, one end of said core being sprung into an end of said shaft and the other end sprung into said receptacle.

ERIC G. THOMAS.